US012664112B2

(12) United States Patent　　(10) Patent No.:　US 12,664,112 B2
Fylkesnes　　　　　　　　　　　　(45) Date of Patent:　Jun. 23, 2026

(54) APPARATUS AND METHOD FOR TRANSFERRING A CRYPTOGRAPHIC KEY OVER A BUS OF A SYSTEM-ON-CHIP

(71) Applicant: Nordic Semiconductor ASA, Trondheim (NO)

(72) Inventor: Elvind Fylkesnes, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 322 days.

(21) Appl. No.: 18/379,111

(22) Filed: Oct. 11, 2023

(65) Prior Publication Data

US 2024/0126709 A1　　Apr. 18, 2024

(30) Foreign Application Priority Data

Oct. 14, 2022　(GB) ..................................... 2215220

(51) Int. Cl.
　G06F 13/28　　　(2006.01)
　G06F 12/14　　　(2006.01)
(52) U.S. Cl.
　CPC .......... G06F 13/28 (2013.01); G06F 12/1408 (2013.01); G06F 2212/1052 (2013.01)
(58) Field of Classification Search
　CPC ........................................................ G06F 13/28
　USPC ........................................................... 710/22
　See application file for complete search history.

(56) References Cited

U.S. PATENT DOCUMENTS

| | | | |
|---|---|---|---|
| 5,708,849 A | 1/1998 | Coke et al. | |
| 6,202,106 B1 * | 3/2001 | Baxter ...................... | G06F 3/14 |
| | | | 711/219 |

| | | | |
|---|---|---|---|
| 6,453,366 B1 | 9/2002 | Broberg, III et al. | |
| 6,778,667 B1 * | 8/2004 | Bakhle .................. | H04L 9/3249 |
| | | | 380/42 |
| 11,386,029 B2 | 7/2022 | Winblad et al. | |
| 11,544,413 B2 | 1/2023 | Aune et al. | |
| 2007/0188183 A1 | 8/2007 | Holtzman et al. | |
| 2008/0072071 A1 * | 3/2008 | Forehand .............. | G06F 21/602 |
| | | | 713/193 |
| 2008/0107260 A1 * | 5/2008 | Duval ..................... | G06F 21/72 |
| | | | 380/28 |
| 2010/0005304 A1 * | 1/2010 | Maruyama ............ | H04L 9/3247 |
| | | | 713/175 |

(Continued)

FOREIGN PATENT DOCUMENTS

GB　　　2 433 611 A　　6/2007

OTHER PUBLICATIONS

IPO Combined Search and Examination Report under Sections 17 and 18(3), dated Apr. 14, 2023, 8 pages.

*Primary Examiner* — Titus Wong
(74) *Attorney, Agent, or Firm* — Klarquist Sparkman, LLP

(57)　　　　　　　　ABSTRACT

The invention provides a direct memory access (DMA) controller. The DMA controller has an address register, a data register and transfer circuitry for transferring data over a bus of a computing system. The DMA controller is configured to use the transfer circuitry to read data over the bus from a memory location having a first memory address, wherein the data comprises a second memory address, and store the second memory address in the address register, and use the transfer circuitry to transfer data over the bus between a memory location having the second memory address, or having a memory address derived from the second memory address, and the data register.

13 Claims, 4 Drawing Sheets

(56) References Cited

U.S. PATENT DOCUMENTS

| | | | |
|---|---|---|---|
| 2014/0177842 A1* | 6/2014 | Yellepeddy | H04L 9/08 |
| | | | 380/277 |
| 2014/0189371 A1* | 7/2014 | Fullerton | G06F 21/72 |
| | | | 713/193 |
| 2015/0256518 A1* | 9/2015 | Buer | H04L 9/0822 |
| | | | 713/171 |
| 2015/0358354 A1* | 12/2015 | Frank | H04L 63/20 |
| | | | 726/1 |
| 2016/0065368 A1* | 3/2016 | Hars | H04L 9/3242 |
| | | | 713/190 |
| 2017/0097900 A1* | 4/2017 | Fielder | G06F 12/1408 |
| 2020/0272588 A1* | 8/2020 | Curtis | G06F 13/287 |
| 2022/0078023 A1* | 3/2022 | Nicolas | G06F 21/602 |

* cited by examiner

APPARATUS AND METHOD FOR TRANSFERRING A CRYPTOGRAPHIC KEY OVER A BUS OF A SYSTEM-ON-CHIP

CROSS REFERENCE TO RELATED APPLICATION

This application claims priority from Great Britain Application No. 2215220.1, filed Oct. 14, 2022, which application is incorporated by reference herein in its entirety.

BACKGROUND OF THE INVENTION

This invention relates to a direct memory access (DMA) controller and systems and methods involving the same.

It is known for an electronic apparatus, such as a system-on-chip (SoC) device, to use DMA controllers to transfer data between locations in memory, without requiring a processor to move the data. This can result in better performance and/or power savings by freeing the processor up to perform other tasks, or by allowing the processor to enter a low-power sleep state while the data is being transferred. Software executing the processor can set up the transfer by providing suitable instructions to the DMA controller in advance (e.g. source and/or destination memory addresses), and then initiating the transfer.

In such existing systems, for each read or write operation, the DMA controller is provided with an address to read from, or is provided with data to write along with an address to which to write the data.

DMA control may be centralised in a single DMA controller that can be used to move data to and from multiple different peripherals, or it may be provided by one or more decentralised DMA controllers or modules, each of which is associated with one respective peripheral.

While the use of DMA can provide significant performance improvements, the present inventors have realised that further improvements are possible in the design of DMA circuitry.

SUMMARY OF THE INVENTION

From a first aspect, the invention provides a direct memory access (DMA) controller comprising:
an address register;
a data register; and
transfer circuitry for transferring data over a bus of a computing system, wherein the DMA controller is configured to:
use the transfer circuitry to read data over the bus from a first memory address, wherein the data comprises a second memory address;
store the second memory address in the address register; and
use the transfer circuitry to transfer data over the bus between the second memory address, or a memory address derived from the second memory address, and the data register.

From a further aspect the invention provides a method, performed by a direct memory access (DMA) controller, to transfer data over a bus of a computing system, the method comprising:
reading data over the bus from a first memory address, wherein the data comprises a second memory address;
storing the second memory address in an address register of the DMA controller; and transferring data over the bus between the second memory address, or a memory address derived from the second memory address, and a data register of the DMA controller.

Thus it will be seen that, in accordance with embodiments of the invention, the DMA controller can use an internal address register to enable the DMA controller to efficiently perform a sequence of two or more data transfers that involve reading from and/or writing to two or more different addresses. It may do this without processor involvement. Advantageously, a processor or peripheral is not required to write an address to the address register of the DMA controller before each of the data transfer operations, as the address register can be directly written by the DMA controller with the data read over the bus from the first memory address.

Storing the second memory address in an internal address register within the DMA controller also means that, at least in some embodiments, the second memory address does not need to be known by any processor of the computing system. This is particularly advantageous for applications where the second memory address is used to control the transfer of sensitive data, such as a cryptographic key, over the bus, as it can allow untrusted software to initiate the transfer while being unable to interfere with the destination to which the data is transferred, thereby providing security to the data.

The data may be transferred from the second memory address, or from a memory address derived therefrom, to the data register, or it may be transferred from the data register to the second memory address, or to a memory address derived therefrom.

From a further aspect, the invention provides a computing system comprising:
a DMA controller as disclosed herein;
a memory; and
a bus, communicatively coupled to the memory and to the DMA controller.

The computing system may further comprise one or more processors, separate from the DMA controller.

The memory may comprise volatile memory (e.g. SRAM) and/or non-volatile memory (which may be rewritable or one-time programmable). The first and/or second memory addresses may be addresses in a same type or different types of memory and/or in a same portion or different portions of memory. In some embodiments, the first memory address may be in a non-volatile memory portion, while the second memory address may be an address of a hardware register, such as an input register of a peripheral.

In a set of embodiments, the DMA controller is implemented as part of an integrated circuit (e.g. a system-on-chip) comprising the DMA controller, the bus, a processor, and at least one memory portion. The bus may be a system bus of the computing system. It may comprise an Advanced High-performance Bus (AHB). The transfer circuitry for reading data from or writing data over the bus may be a bus master for the bus.

The DMA controller may be used by multiple peripherals, but in some embodiments the DMA controller is integrated or associated with a single peripheral, such as a Key Management Unit (KMU) peripheral of the computing system.

In a set of embodiments, the DMA controller comprises a DMA module and a DMA control portion, wherein the DMA module is communicatively coupled to the DMA control portion by an instruction bus, and optionally by one or more data links. The instruction bus may be a parallel bus. The DMA module may be configured to perform operations in accordance with respective instructions (e.g. multi-bit instruction words) written to the DMA module by the DMA control portion over the instruction bus. The DMA control portion may comprise hardware logic implementing one or more finite state machines (FSMs) for controlling the DMA module.

The DMA controller may support one or more types of multi-step data transfer operation. For each multi-step data transfer operation which the DMA controller supports, the DMA control portion may be arranged to write a respective sequence of instructions (e.g. instruction words) to the instruction bus to control the DMA module to perform the multi-step data transfer operation. A successive instruction may be written to the instruction bus on successive clock cycles, such that the DMA module may be sequentially instructed to carry out a series of data transfers involved in a multi-step data transfer operation—e.g. the steps of i) reading the second address from the first address in the memory and loading the address register with the second address, and ii) reading data from or writing data to an address dependent on the second address. The sequences of instructions for each multi-step data transfer operation may be issued by a dedicated finite state machine (FSM) in the DMA control portion. The DMA control portion may implement a plurality of FSMs for instructing the DMA module to perform a respective plurality of types of multi-step data transfer operation. It may be configured so that only one FSM can be active at a time.

Each instruction may be sent as a respective instruction word, which may span a width of the instruction bus. The instruction may comprise a plurality of fields (which may be single-bit and/or multi-bit fields), wherein each field controls the configuration or operation of a different respective component of the DMA module. In some embodiments, each instruction field is communicated over a respective dedicated line or set of lines of the instruction bus (e.g. a binary field may be communicated over a single line of the instruction bus, and a multi-bit field may be communicated over a plurality of lines). In some embodiments, a field controls whether data read over the system bus by the DMA module is written to the address register. In some embodiments, a field controls whether the DMA module is operated in read or write mode.

The DMA controller (e.g. the DMA control portion) may comprise a control portion interface. The control portion interface may comprise at least one input register which the processor can write to over a bus; for example, over an Advanced Peripheral Bus (APB). In a set of embodiments, the first memory address is written into the address register from an input register in the control portion interface. A field of each instruction may control whether the address register receives an input from the input register of the control portion interface or from data read by the transfer circuitry. It may control a multiplexer that outputs to the address register.

In a set of embodiments, the data register is configured to receive data from the DMA control portion. Accordingly, the DMA control portion may provide the DMA module with the data which should be written to a memory address in a write operation of the DMA module. It may provide data to be written to the second memory address or an address derived therefrom. The data register may additionally or alternatively be arranged to receive data read by the transfer circuitry from a memory address (e.g. from the second memory address or an address derived therefrom) in a read operation of the DMA module.

In a set of embodiments, the DMA controller further comprises address-generating logic, and the transfer circuitry is arranged to receive an address generated by the address-generating logic. The transfer circuitry may be configured to transfer data to or from the generated address over the bus. The address-generating logic may be configured to generate an address by adding one or more offsets to a source address provided as input to the address-generating logic. In a set of such embodiments, the generated address may, at least in some states of the DMA controller, be generated by the address-generating logic from the address stored in the address register. In other states, the generated address may be generated from a base address known or accessible to the DMA controller, e.g. stored in a hardware register external to the DMA controller. The one or more offsets may be determined by values provided to the address-generating logic by the DMA controller (e.g. from a register of FSM or the DMA control portion). The method by which the generated address is generated by the address-generating logic may be controlled in accordance with one or more fields of an instruction on the instruction bus.

In some embodiments, the transfer circuitry may transfer data between the second memory address and the data register. In some embodiments, the transfer circuitry may transfer data between the data register and an offset from the second memory address, wherein the offset is determined by a FSM within the DMA control portion.

The DMA controller may be configured to use the transfer circuitry to perform a succession of transfers of respective data words between the data register and respective memory addresses, wherein each memory address is offset from the second memory address by a different respective offset. The data words may be of equal size (e.g. being a width of the bus), and the respective offsets may be successive integer multiples of this size.

Although the design of DMA controller disclosed herein is suitable for use in many types of data transfer operation, in a set of embodiments, the DMA controller is implemented as part of an integrated circuit device comprising a secure memory portion which can only be accessed by the DMA controller. In a set of such embodiments, the DMA controller may be implemented as part of a Key Management Unit (KMU) peripheral of the integrated circuit device, which may be configured to use the DMA controller to transfer cryptographic key data to or from the secure memory portion. The secure memory portion may store, or be arranged to store, one or more keyslots, for storing respective cryptographic keys and/or a respective destination address for each key. A trusted user or software (e.g. a super user) may store data to a keyslot to control how a key stored in the keyslot can be used (e.g. to restrict what destination the key can be sent to); the DMA controller then allows an untrusted user or software (e.g. a normal user) to instruct the KMU to push the key to its destination, without the user or any processor of the device being trusted to handle or provide the destination address. The memory occupied by the keyslots may begin at a keyslot base address, and each keyslot may occupy the same amount of space in the secure memory portion. The keyslots may be stored consecutively in the secure memory portion. In a set of such embodiments, the first memory address may be an address within a keyslot for a key in the secure memory portion, and the second memory address may be a destination to which the key should be transferred (e.g. an input register of a cryptographic engine within which the key is intended to be used).

In a set of embodiments where the DMA controller is implemented as part of a KMU peripheral, and the DMA controller comprises address-generating logic, the address-generating logic may be configured to generate the first memory address by adding an offset to an address stored in a base address register of the computer system (and optionally by also adding a keyslot index offset). The offset may correspond to an offset of a field within a keyslot, e.g. to a destination field that stores a memory address to which the key should be pushed, or to a field storing all or part of a cryptographic key. The offset may be provided to the address-generating logic from a DMA control portion of the DMA controller.

The DMA controller may be implemented by hardware digital logic gates, which may be distinct from the logic gates of any processor of the computer system.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
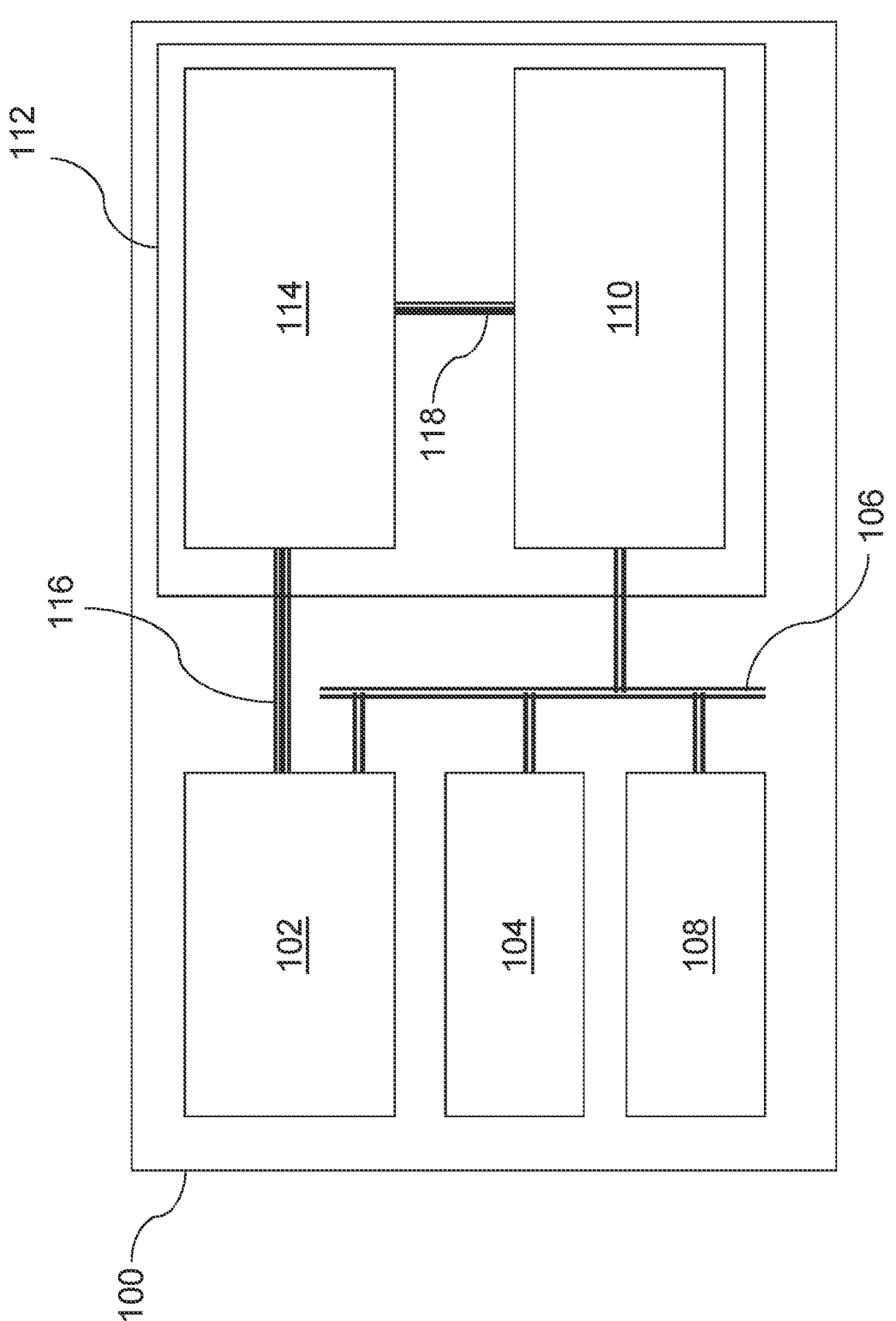
FIG. 1 is a schematic drawing of an exemplary computing system having a DMA controller in accordance with the invention.

FIG. 1 shows a computing system 100 that in a set of exemplary embodiments is a system-on-chip (SoC), but which could in other embodiments be formed of discrete components. The computing system 100 has a processor 102 and a memory portion 104. The memory portion 104 may include volatile memory (e.g. SRAM) and/or non-volatile memory (e.g. flash). The memory portion 104 can store software instructions for execution by the processor 102 as well as persistent and transient data, and is accessible to the processor 102 via an on-chip system bus 106 which supports direct memory access (DMA). The system bus 106 may include one or more AHB's (Advanced High-Performance Bus). The system 100 may, of course, have further processors and other typical components such as interrupt controllers, clock systems, power systems, cryptographic engines, timers, wired interfaces, radios, other integrated peripherals, etc., which are not shown here.

In some embodiments, the computing system 100 also includes a secure memory portion 108. The secure memory portion is provided separately to the memory portion 104, and cannot be accessed by the processor 102. Instead, the system bus 106 includes hardware filters configured such that the secure memory portion 108 can only be accessed over the system bus 106 by a DMA module 110. The secure memory portion 108 may be arranged to provide a set of secure configuration registers.

The DMA module 110 is implemented in this embodiment as part of a peripheral 112, which the processor 102 can interact with via a DMA control portion 114 implemented as hardware logic circuitry. The DMA module 110 and DMA control portion 114, and the connections between them, together provide a DMA controller as disclosed herein. The DMA control portion 114 is communicably connected to the processor 102 via an APB (Advanced Peripheral Bus) 116 slave interface. It is also communicably coupled to the DMA module 110 via a dedicated instruction bus 118. In embodiments with a secure memory portion 108, only the DMA module 110 has access to the secure memory portion 108, and so the progress of a DMA data transfer, and the contents transferred between the secure memory portion 108 and the DMA module 110, can be hidden from other components in the computing system 100, with only the result of the operation (i.e. the completion of the task, or an error state reached) being accessible to the processor 102, via an interface of the DMA control portion 114.

Figure 2:
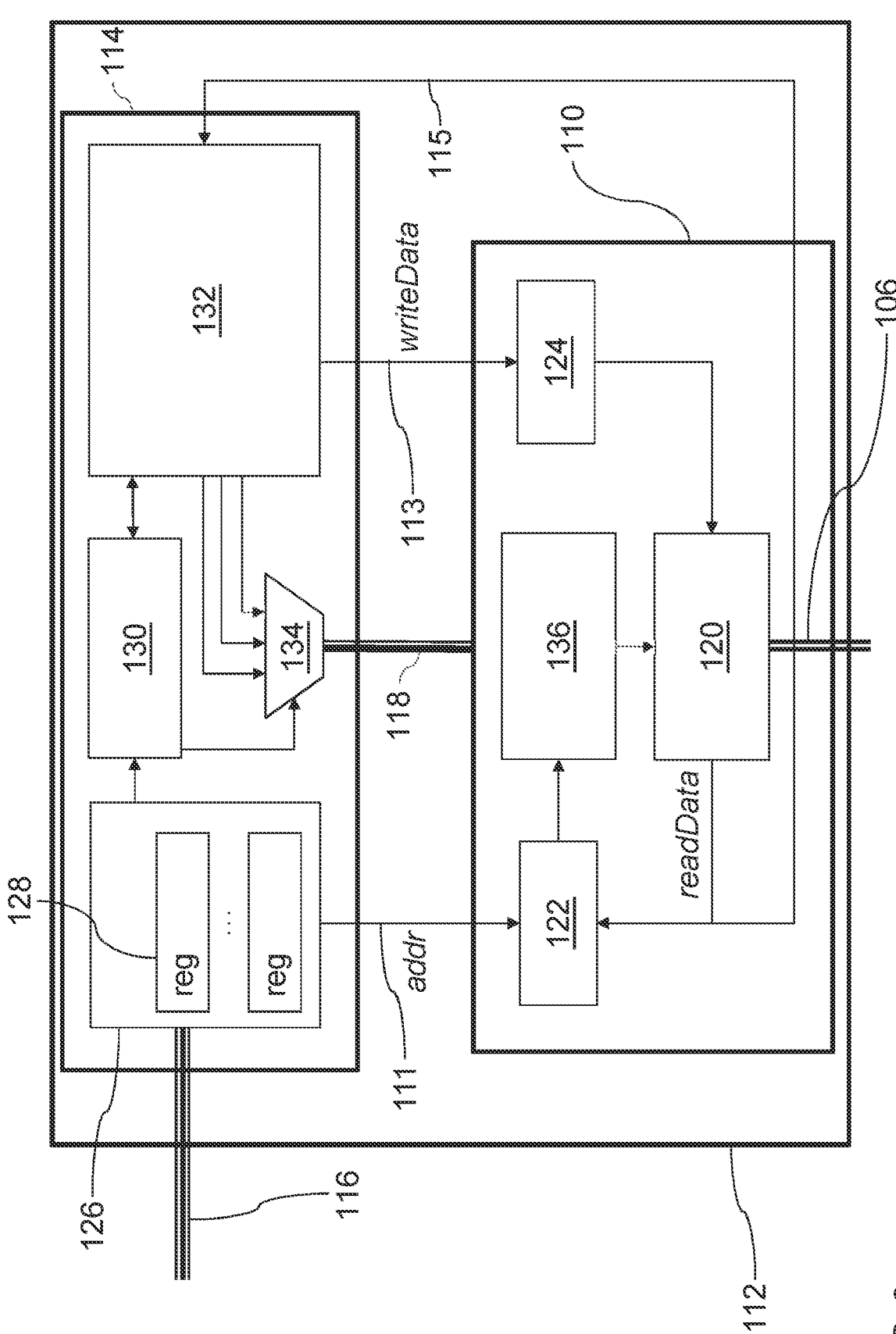
FIG. 2 is a schematic drawing of the direct memory access (DMA) module and DMA control portion of the DMA controller of FIG. 1.

FIG. 2 shows a more detailed view of the peripheral 112, including the DMA module 110 and DMA control portion 114. Depending on its purpose, the peripheral 112 may include additional components, such as digital logic, analog circuitry, external interfaces, etc., which are omitted from FIG. 2 for simplicity.

The DMA module 110 includes bus transfer circuitry 120, which is configured to interact with the system bus 106 as a bus master. The bus transfer circuitry 120 is also connected to an address register 122 and to a data register 124. The address register 122 is sized for holding a single memory address (e.g. holding 32 bits, if the system 100 uses 32-bit memory-mapped addressing). The DMA module 110 optionally also comprises an address generator 136, described below.

The control portion 114 has an interface portion 126, an operation arbiter 130, and a bank of per-operation Finite State Machines (FSMs) 132. The processor 102 interfaces with the control portion 114 by writing information to interface registers 128 in the interface portion 126 via the APB 116. The interface portion 126 is connected to the operation arbiter 130, which itself is further connected to the bank of per-operation Finite State Machines (FSMs) 132. Each of the FSMs in the FSM bank 132 is connected to a common multiplexor 134 which outputs to the instruction bus 118, with the multiplexor being set by the operation arbiter 130.

The DMA control portion 114 is connected to the DMA module 110 via a dedicated internal instruction bus 118. The instruction bus 118 dictates what should occur for each step of a multi-step data transfer operation. The DMA control portion 114 is also connected to the DMA module 110 by a dedicated "addr" address link 111 for transferring address values, and by a dedicated "writeData" data link 113 for transferring data to be written out over the system bus 106 by the DMA module 110, and by a dedicated "readData" data link 115 for transferring data read in from the system bus 106 by the DMA module 110. The address link 111 enables data to be written from one or more interface registers 128 in the control portion 126 to the address register 122, and the write-data link 113 enables data to be written from the FSM bank 132 to the data register 124.

In some embodiments, the DMA module 110 also has an address generating portion 136, connected to the transfer circuitry 120 and the address register. In use, the address generating portion 136 outputs an address to the transfer circuitry 120. The address generating portion 136 can be configured to output an address which is derived from (e.g.

with an offset added) or equal to the address stored in the address register 122. The address generating portion 136 can also be configured to generate an address using known information supplied from the control portion 114, without using information from the address register 122. In other embodiments there is no address generating portion 136, and the address register 122 may be directly connected to the bus transfer circuitry 120 such that the transfer circuitry 120 fetches the address to which it should read or write directly from the address register 122 without any modification.

The operation arbiter 130 is responsible for starting different multi-step data transfer operations (e.g. a particular transfer operation requested by software executing on the processor 102), and delegating access to the DMA module 110 through the instruction bus 118. Each FSM is designed to be very restrictive, only allowing a new operation to start when no other operations are ongoing. A multi-step data transfer operation is triggered via the interface portion 126 and will end when the FSM responsible for performing the operation sends an "operationFinished" signal back to the operation arbiter 130.

The design is implemented with each multi-step operation having a separate state machine in the FSM bank 132 to control all the steps of that operation. Separating the handling of each operation in this way avoids the need for one operation to accommodate the progression of another operation and thus reduces complexity by avoiding cross-interaction between operations. Partitioning the FSM bank 132 and other components of the DMA control portion 114 from the DMA module 110, and linking them by an instruction bus 118 and data lines 111, 113, 115 also results in an elegant and space-efficient design by providing the more general-purpose elements in the DMA module 110, for re-use across multiple steps, while operation-specific elements are grouped together in the DMA control portion 114.

The per-operation FSM blocks within the FSM bank 132 contain one FSM each. As inputs they get a signal from the operation arbiter 130 for when each FSM should start its operation. They may also receive incoming data, read by the DMA module 110, when the FSM needs to react to it. The output from these modules includes instructions, sent over the instruction bus 118, where an instruction word is written to the instruction bus using the multiplexor 134. Which instruction word is written to the instruction bus determines the action of the DMA module 110 at each step of a multi-step data transfer operation. The FSMs can also output data over the writeData link 113 to update the data register 124 of the DMA module 110 (e.g., for providing data to be written out to a secure memory location 108), and can further output the "operationFinished" signal to the operation arbiter 130 to signal that a multi-step data transfer operation has been completed.

In order to perform a multi-step data transfer, the DMA module 110 is controlled in accordance with an instruction word written to the instruction bus 118, where the instruction word is generated by a selected active FSM in the DMA control portion 114. The instruction word has several fields, where each field controls the operation of, or provides input to, a component in the DMA module 110. Some of these fields are individual bits, and have a value of either 1 or 0, e.g. for switching a component of the DMA module 110 between two states—for example, controlling whether to use the bus transfer circuitry 120 to read or write. Other fields may be larger, enabling the DMA control portion 114 to supply data to the DMA module 110 such as an offset for generating a memory address.

Figure 3:
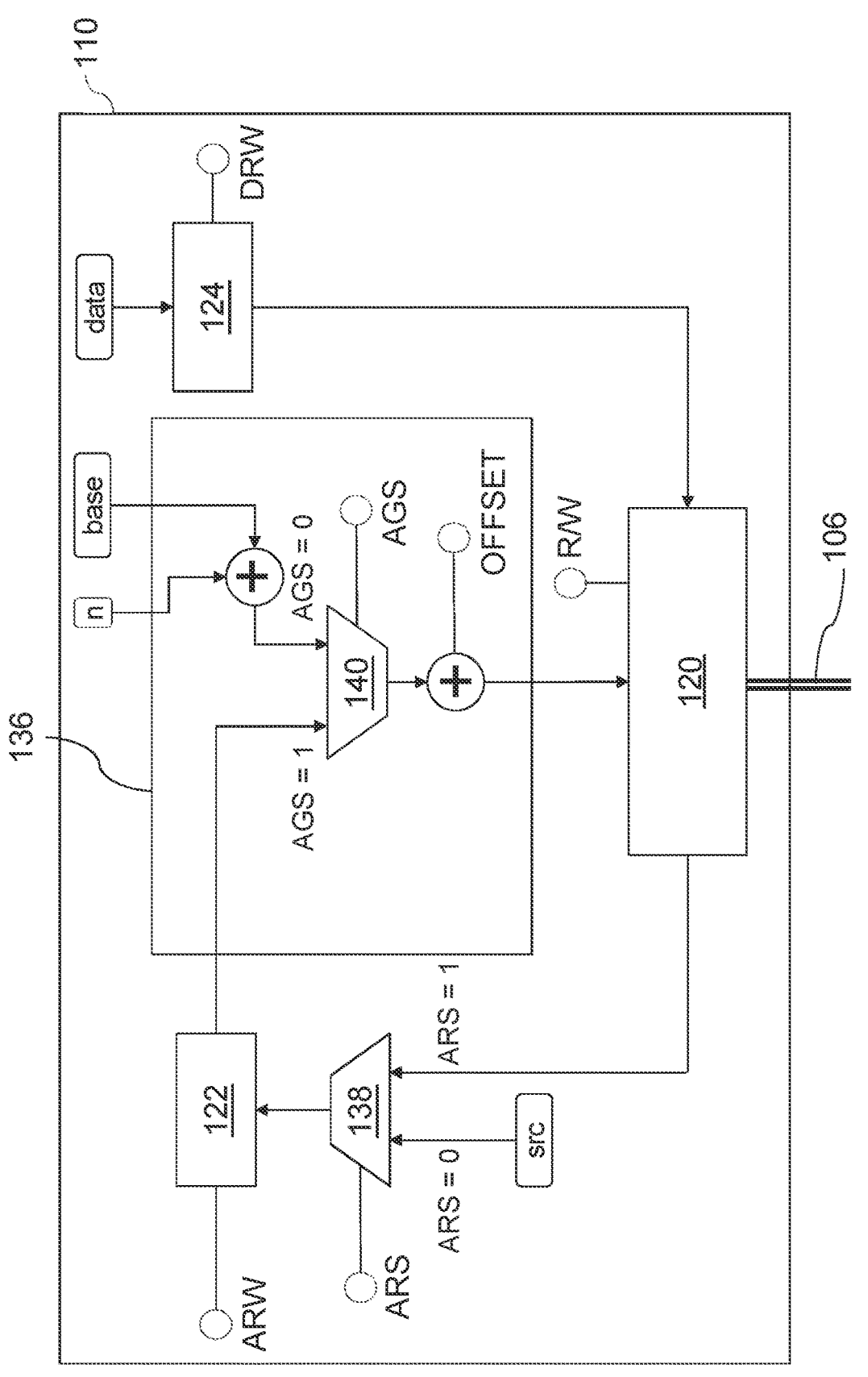
FIG. 3 is a more detailed schematic drawing of the DMA module showing various control input fields.

FIG. 3 is a more detailed view of the DMA module 110, which shows the input fields that control the operation of its components. The inputs denoted by circles—ARW, DRW, ARS, AGS, OFFSET, R/W—correspond to the configuration fields of the instruction word, whereas the inputs denoted by a rectangle—"src", "n", "base", "data"—correspond to data supplied by registers 128 in the control portion 114 or from elsewhere in the memory 104 of the computer system 100.

Figure 4:
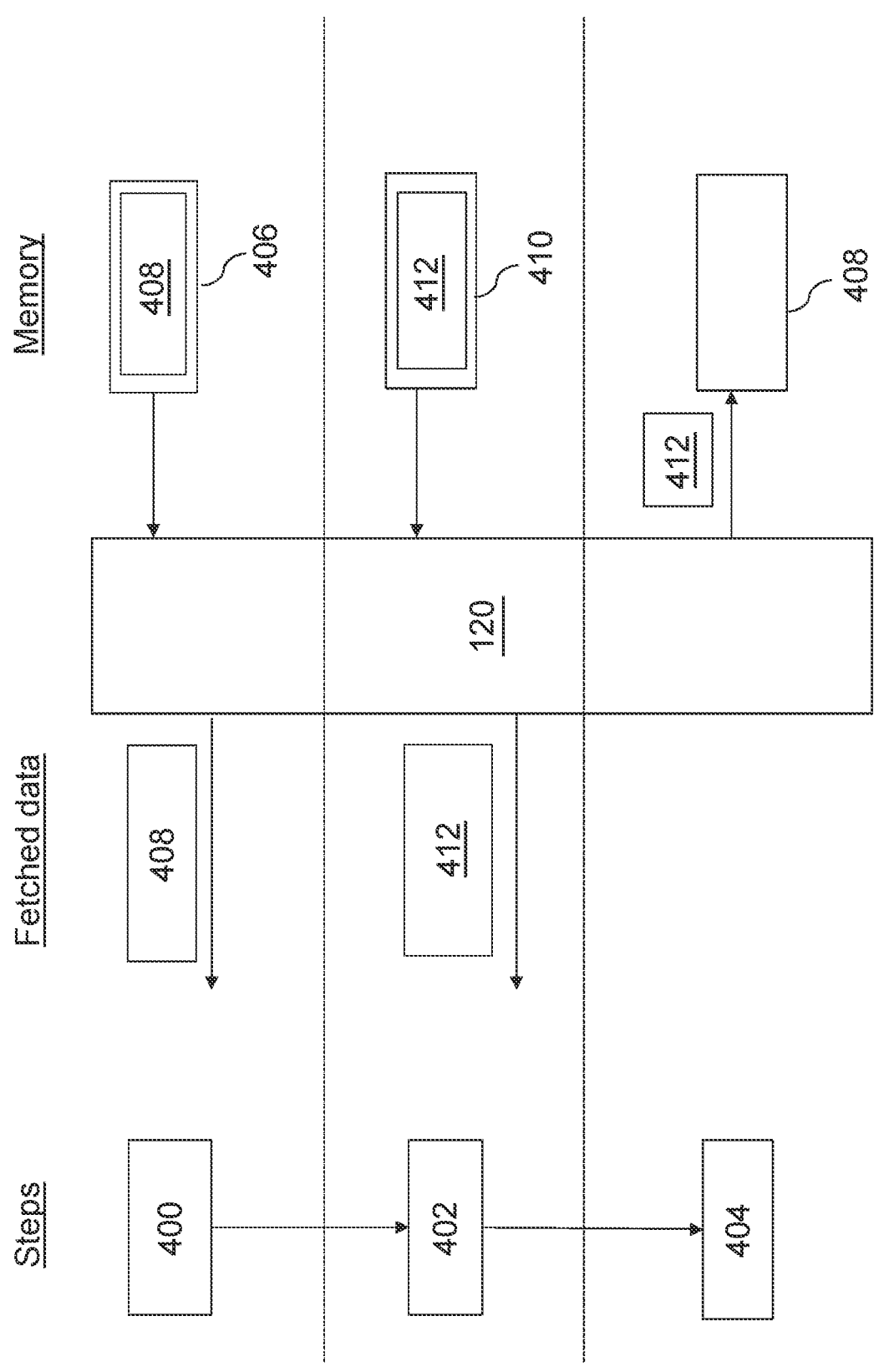
FIG. 4 is a high-level flow chart of operations performed by the DMA controller during a multi-step data transfer operation.

Also shown in FIG. 4 are an address register input selection multiplexor 138, and an address generator multiplexor 140 that is located within the address-generating portion 136.

The address input selection multiplexor 138 is controlled by instruction field ARS (AddressRegisterSelect). This instruction field allows the multiplexor 138 to switch between outputting the memory address obtained from a source register 128 identified by input "src", and outputting a memory address from the read output of the transfer circuitry 120 (i.e. an address value read in from memory over the system bus 106). Instruction field ARW (AddressRegisterWrite), when enabled (set to 1), causes the contents of the address register 122 to be updated with the output of the multiplexor 138.

The address generator multiplexor 140 is controlled by instruction field AGS (AddressGeneratorSelect). This instruction field allows the multiplexor 140 to be switched (by the control portion 114) between outputting the memory address stored in the address register 122, and outputting a memory address calculated as the sum of an input base address ("base") and an offset determined as a multiple of an integer parameter ("n") supplied by the control portion 114. The instruction field OFFSET can be used to further add to the memory address outputted from the multiplexor 140. For example, the address generator 136 may comprise logic to calculate an address as "base"+32×"n"+4×OFFSET. In one set of embodiments, the "base" address may point to the start of a cryptographic-key storage region within the secure memory portion 108, while the parameter "n" indexes successive 'keyslot' memory structures within the region, and the OFFSET parameter can be used to address individual words within a particular keyslot for reading from or writing to (e.g. individual words of key data, or a destination address associated with the key, or other metadata for the key).

The data register 124 is controlled by instruction field DRW (DataRegisterWrite). When enabled (set to 1), the contents of the data register 124 are updated with data from the "data" input provided from the control portion 114. This data could be derived from data received by the control portion 114 from the system bus 106 and DMA module 110 in an earlier step, or could be derived from data received by the control portion 114 over the APB interface 116. Although not shown here, in some variant embodiments the data input may be permanently or switchably linked directly to the "readData" output 115 of the transfer circuitry 120. That way, if the data to be written out over the bus system 106 comes directly from a previous DMA read operation, it can be fed round within the DMA module 110, without any need to involve the DMA control portion 114 to supply the data input.

Finally, instruction field R/W controls whether the transfer circuitry 120 is operated in read or write mode, either reading data in over the system bus 106 from the address outputted by the address generator 136 (for sending to the DMA control portion 114 over the readData link 115, and/or for writing to the data register 124 in embodiments that provide an internal read-data feedback path within the DMA module 110), or writing the contents of the data register 124 out over the system bus 106 to the address outputted by the address generator 136.

An exemplary multi-step data transfer operation, which the DMA module 110 can be used to perform, is transferring data from a source address to a different destination address, where the destination address is retrieved by the DMA module 110, rather than supplied by the processor 102. One or both addresses may be in the secure memory portion 108. A flow chart of this operation of the bus activity of the DMA module 110 in this exemplary multi-step data transfer is shown in FIG. 4.

In a first step 400, the transfer circuitry 120 of the DMA module 110 reads data over the system bus 106 from a first memory address 406. This first memory address 406 may be determined by a memory address previously stored in the address register 122, or by a memory address generated by the address generator 136 from a "base" value and "n" parameter. It may include an added offset which is supplied by the DMA control portion 114 as an OFFSET value via the instruction bus 118. The read data is a second memory address that specifies a destination memory address 408 (e.g. an input register of a cryptographic coprocessor) to which the transfer circuitry 120 should push data (e.g. crypto-graphic key data) in a following step of the multi-step operation. By setting ARS=1, the DMA control portion 114 can instruct the DMA module 110 to store this second memory address 408 in the address register 122.

In a second step 402, the transfer circuitry 120 reads data 412 (e.g. key data) over the system bus 106 from a different memory address 410, at which data 412 is located that is to be pushed to the destination memory address 408. To do so, while retaining the second memory address 408 in the address register 122 for further use, the DMA control portion 114 may set AGS=0 and instruct the address generator 136 to generate the different memory address 410 based on appropriate "base", "n" and OFFSET parameters. The output of the transfer circuitry 120 in the second step 402 is therefore the data 412 to be pushed.

In a third step 404, the active FSM in the DMA control portion 114 sets AGS=1 and instructs the transfer circuitry 120 to write the data 412 (e.g. a word-sized portion of key data) to the destination memory address 408 stored in the address register 122 or derived therefrom, i.e. by adding an offset determined by the OFFSET parameter (e.g. an offset that is incremented with each successive portion of key data that is transferred).

In a particular example of the multi-step data transfer operation described above, the DMA controller 114, 110 of the peripheral 112 could be instructed by the processor 102 to retrieve a cryptographic key from the secure memory portion 108, and push the key to a predetermined intended destination (e.g. to a key-input register of a cryptographic engine of the system 100), where that destination first has to be retrieved from another memory address by the DMA module 110. In this example, cryptographic keys may be stored alongside respective predetermined destinations to which the keys are to be transferred, in 'keyslot' portions of the secure memory portion 108. Accordingly, following the steps explained above, the DMA module 110 could first read the destination memory address of a key from a particular 'keyslot', then read the key's value from the same 'keyslot', and push the key's value to the destination memory address. This is a particularly beneficial use case, as the lack of on-going involvement from the processor 102 in this multi-step data transfer operation, after initiating the transfer, ensures that the key value and push destination remain hidden from the processor 102. The keyslot may have been preloaded during manufacturing, or may have been at least partly written by trusted software executing on the device 100. The design of the peripheral 112 and its DMA controller 114, 110 allows untrusted user software to initiate a push of a key to its predetermined destination, while preventing such untrusted software from being able to view or change the destination address, thereby protecting the key data from attacks. Although this example is described in the context of cryptographic keys, embodiments may be beneficial for any multi-step data transfer, and may be especially advantageous where the destination and value of the data should remain secure.

In a variant set of embodiments, the DMA module 110 may also have an internal data register for receiving data read over the system bus 106 by the DMA module 110. This could be the same register as the data register 124, or a separate register. The data link 113 to the DMA control logic 114 may be bidirectional. In another set of embodiments, the DMA module 110 may be configured only for receiving data over the system bus 106—i.e. not supporting sending data out over the system bus 106 at all.

It will be appreciated by those skilled in the art that the invention has been illustrated by describing one or more specific embodiments thereof, but is not limited to these embodiments; many variations and modifications are pos-sible, within the scope of the accompanying claims.

I claim:

1. A system-on-chip comprising:
   a processor;
   a secure memory portion;
   a key management unit peripheral; and
   a bus,
   wherein the key management unit peripheral comprises a direct memory access (DMA) controller;
   wherein the secure memory portion is accessible to the DMA controller;
   wherein the secure memory portion is not accessible to the processor;
   wherein the secure memory portion is arranged to store, in each of one or more keyslots, a respective crypto-graphic key and a respective destination memory address for the cryptographic key;
   wherein the DMA controller of the key management unit comprises:
   an address register;
   a data register; and
   transfer circuitry for transferring data over the bus; and
   wherein the DMA controller of the key management unit is configured to:
   use the transfer circuitry to read the respective crypto-graphic key, over the bus, from a keyslot of the one or more keyslots;
   use the transfer circuitry to read the respective destination memory address, over the bus, from the keyslot;
   store the destination memory address in the address register;
   use the transfer circuitry to transfer the cryptographic key, over the bus, from the data register of the DMA controller, to a memory location having the destination memory address stored in the address register, or having a memory address derived from the destination memory address stored in the address register.

2. The system-on-chip of claim 1, wherein the DMA controller comprises a DMA module and a DMA control portion, wherein the DMA module is communicatively coupled to the DMA control portion by an instruction bus, and wherein the DMA module is configured to perform operations in accordance with respective instructions written to the DMA module by the DMA control portion over the instruction bus.

3. The system-on-chip of claim 2, wherein the instruction bus is a parallel bus.

4. The system-on-chip of claim 2, wherein the DMA control portion comprises hardware logic implementing one or more finite state machines (FSMs) for controlling the DMA module.

5. The system-on-chip of claim 2, wherein the DMA controller is configured to support one or more types of multi-step data transfer operation, and wherein, for each multi-step data transfer operation that the DMA controller supports, the DMA control portion is arranged to write a respective sequence of instruction words to the instruction bus to control the DMA module to perform the multi-step data transfer operation.

6. The system-on-chip of claim 5, wherein the DMA control portion implements a respective dedicated finite state machine (FSM) for each type of multi-step data transfer operation supported by the DMA controller, and wherein each FSM is configured to issue the respective sequence of instructions for the respective multi-step data transfer operation.

7. The system-on-chip of claim 6, wherein the DMA controller supports a plurality of types of multi-step data transfer operation, and wherein the DMA control portion is configured so that only one of the respective FSMs can be active at a time.

8. The system-on-chip of claim 2, wherein each instruction is sent as a respective instruction word comprising a plurality of fields, wherein each field controls the configuration or operation of a different respective component of the DMA module.

9. The system-on-chip of claim 8, wherein a field of each instruction controls whether data read over the system bus by the DMA module is written to the address register.

10. The system-on-chip of claim 1, further comprising a control portion interface having at least one input register that can be written to by a processor of the computing system.

11. The system-on-chip of claim 1, further comprising address-generating logic configured to generate an address by adding one or more offsets to a source address provided as input to the address-generating logic, and wherein the transfer circuitry is arranged to receive an address generated by the address-generating logic and to transfer data to or from a memory location having the generated address over the bus.

12. The system-on-chip of claim 1, configured to use the transfer circuitry to perform a succession of transfers of respective data words between the data register and respective memory locations having respective memory addresses, wherein each memory address is offset from the second memory address by a different respective offset.

13. A method of transferring a cryptographic key over a bus of a system-on-chip, wherein the system-on chip comprises:

a processor;

a secure memory portion;

a key management unit peripheral; and a bus, wherein the key management unit peripheral comprises a direct memory access (DMA) controller;

wherein the secure memory portion is accessible to the DMA controller;

wherein the secure memory portion is not accessible to the processor;

wherein the secure memory portion is configured to store, in each of one or more keyslots, a respective cryptographic key and a respective destination memory address for the cryptographic key;

wherein the DMA controller of the key management unit comprises:

an address register;

a data register; and transfer circuitry for transferring data over the bus; and wherein the method comprises:

reading the respective cryptographic key, over the bus, by the transfer circuitry of the DMA controller, from a keyslot of the one or more keyslots;

reading the respective destination memory address, over the bus, by the transfer circuitry of the DMA controller, from the keyslot;

storing, by the DMA controller, the destination memory address in the address register; and transferring the cryptographic key, over the bus, by the transfer circuitry of the DMA controller, from the data register of the DMA controller, to a memory location having the destination memory address stored in the address register, or having a memory address derived from the destination memory address stored in the address register.

* * * * *